United States Patent [19]

Bayne et al.

[11] Patent Number: 4,618,257

[45] Date of Patent: Oct. 21, 1986

[54] COLOR-SENSITIVE CURRENCY VERIFIER

[75] Inventors: Robert T. Bayne, Carmel; James E. Heidelberger, Indianapolis, both of Ind.

[73] Assignee: Standard Change-Makers, Inc., Indianapolis, Ind.

[21] Appl. No.: 568,586

[22] Filed: Jan. 6, 1984

[51] Int. Cl.[4] .......................... G01J 3/50; G06K 5/00; G08B 21/00

[52] U.S. Cl. ...................................... 356/71; 209/534; 250/205; 250/556; 356/402; 356/446; 356/448; 364/526

[58] Field of Search ................. 356/71, 445, 448, 433, 356/432, 73, 402, 407, 425, 41, 446–447; 250/556, 557, 205; 209/534; 364/526

[56] References Cited

U.S. PATENT DOCUMENTS

| | | | |
|---|---|---|---|
| 3,122,227 | 2/1964 | Bookout et al. | 356/71 |
| 3,360,653 | 12/1967 | Phares . | |
| 3,436,552 | 4/1969 | Bayha . | |
| 3,480,785 | 11/1969 | Aufderheide | 356/71 |
| 3,491,243 | 1/1970 | Tsugami | 356/71 |
| 3,496,370 | 2/1970 | Haville et al. . | |
| 3,497,304 | 2/1970 | Berube . | |
| 3,679,314 | 7/1972 | Mustert | 356/71 |
| 3,910,701 | 10/1975 | Henderson et al. | 356/73 X |
| 3,922,090 | 11/1975 | Fain | 356/71 |
| 4,032,777 | 6/1977 | McCaleb | 250/205 X |
| 4,097,731 | 6/1978 | Krause et al. | 250/205 |
| 4,127,328 | 11/1978 | Gorgone et al. | 356/71 |
| 4,147,430 | 4/1979 | Gorgone et al. | 356/71 X |
| 4,179,685 | 12/1979 | O'Maley | 250/556 X |
| 4,183,665 | 1/1980 | Iannadrea et al. | 356/71 |
| 4,184,081 | 1/1980 | Bergamini | 250/556 |
| 4,199,261 | 4/1980 | Tidd et al. | 356/448 |
| 4,204,765 | 5/1980 | Iannadrea et al. | 356/71 |
| 4,255,057 | 3/1981 | Williams | 209/354 X |
| 4,406,996 | 9/1983 | Oka | 250/205 X |

FOREIGN PATENT DOCUMENTS

| | | | |
|---|---|---|---|
| 0066894 | 5/1979 | Japan | 209/534 |
| 1410823 | 10/1975 | United Kingdom | 356/402 |

*Primary Examiner*—Vincent P. McGraw
*Assistant Examiner*—Robert D. V. Thompson, III
*Attorney, Agent, or Firm*—Woodard, Weikart, Emhardt & Naughton

[57] ABSTRACT

A color-sensitive currency verifier operating with a plurality of narrowband light sources optically coupled to a single broadband photodetector and including means for automatically balancing the color outputs of the various light sources. Color balancing is accomplished just prior to the examination of a specimen bill. The data samples are taken under the control of a microprocessor and used to authenticate the specimen bill both on the basis of pattern and color information stored in memory. Multiple data samples from a single target area are divided to compensate for soiling condition of the bill, and further compensation for condition of the bill is provided by adjusting the conversion scale factor of an A/D converter on the basis of data samples taken from a reference target area on the surface of the specimen bill before test or data samples are taken.

20 Claims, 9 Drawing Figures

COLOR-SENSITIVE CURRENCY VERIFIER

BACKGROUND OF THE INVENTION

The present invention relates to currency verifiers for use in currency changers, vending machines and the like, and particularly to currency verifiers capable of checking color.

Color checking to detect the presence of appropriately colored ink on U.S. or other types of currency has proven to be a useful aid in automated currency verification systems. Most techniques to date which have utilized color checking have depended on arrangements of photodetectors using filters, with such photodetectors arranged in a bridge circuit to attempt to detect color. Such arrangements, however, only achieve a limited degree of sensitivity and can usually be defeated by some shade of gray or colorless marking on the paper at the spot being observed. This is at least partially caused by the fact that in an engraved area of a U.S. bill the green ink lines typically cover only 30 percent or so of the surface, and thus the effect of the ink color on the nature of the reflected light is substantially reduced.

The general condition of the currency or specimen bill being examined is another factor which can affect the results of a color check. If the bill is soiled, the reflection of light from the surface of the bill is reduced. The properties of the reflected light are dependent upon a large number of factors relating to the paper, including its texture and translucence, degree of soiling, and amount of color pigment. The large number of factors affecting the magnitude of the reflected rays tends to mask the effect of the different ink colors and therefore make the detection of any particular color extremely difficult.

One attempt to reduce susceptibility to extraneous factors involved the measurement of light reflected from one point on a bank note with two photocells, one covered with a green filter and the other covered with a red filter. The two photocells were included in a circuit which produced the difference between the two measurements. One such circuit is shown in U.S. Pat. No. 3,496,370 to Haville et al. Because the measured difference values for genuine bills vary widely due to soiling, however, broad tolerance limits are required with this approach.

Recognizing this problem, Mustert, in U.S. Pat. No. 3,679,314, discloses an alternative system which determines the ratio of two readings from a single test point rather than determining the difference value. Mustert found that, since soiling of a bill has substantially nonselective absorption properties, the influence of soiling can be eliminated by taking the ratio of the two measurements. The Mustert apparatus uses rotating mechanical parts to provide the two different colors of light, with two color filters being mounted on a rotating disc in the path of a single light source, or alternatively by having a light beam alternately directed through two stationary filters by a rotating mirror.

Another apparatus, described in U.S. Pat. No. 4,204,765 to Iannadrea et al., tests colored securities with sequentially operated LEDs of various colors directed toward a particular point on the surface of a bill. A single photodetector senses the reflected light of each wavelength. This apparatus does not need external color filters. However, the output signals associated with the different LEDs are supplied to comparator circuitry to determine their relative values, and so wide tolerances are still necessary because of the wide variations in signals from genuine bills.

Phares, in U.S. Pat. No. 3,360,653, compensates for the condition of a test bill by adjusting the voltage level of each test photocell according to the light received by a reference photocell positioned adjacent a clear portion of the bill. The test photocells, which are each associated with a different test area, receive light from a single light source and thus generate one output signal each. Each test photocell is coupled to a window detector which provides an acceptance signal for an output signal within its preset voltage range. A bill is determined to be valid if all window detectors produce acceptance signals, without regard to relative values of different color signals from a single test area or of signals from different areas.

Haville et al., mentioned above, includes a light control circuit which compensates for the condition of the bill by adjusting the intensity of the light source in a pattern-evaluating circuit based on the light received from a dedicated reference photocell. This technique is not applicable without substantial modification to a color detection circuit with two light sources of different colors because of imbalances in intensity which would result from slight differences in the light source characteristics.

Aging and environmental conditions can also adversely affect currency verifier operation. The spectral distribution of the output of a narrowband light source, such as a narrowband LED, often changes significantly over the life of the light source. It has been learned that, in currency verifiers detecting color differences with a pair of light sources, these changes often produce significantly different effects on the two light sources, contributing to errors in bill verification through circuit imbalance. Environmental factors have also been found to cause circuit imbalance. In many areas of the country vending machines and currency changers frequently experience changes in ambient temperature of 30 degrees fahrenheit or more in the course of a day. Such temperature changes can cause a shift in the peak of the spectral distribution or affect the amplitude characteristic of a light source. Output amplitude can also change with dirt or dust on the lens of a light source. These conditions produce an overall reduction in accuracy for existing currency verifiers of this type.

SUMMARY OF THE INVENTION

A currency verifier more specifically described later includes a plurality of narrowband light sources optically coupled to a single broadband photodetector for generation of individual output signals of various colors for a particular target area of a specimen bill placed in the currency verifier for verification. The apparatus automatically balances the color outputs of the various light sources in response to output signals produced by the photodetector during a color balancing interval. The light sources are sequentially energized to produce a train of output pulses from the photodetector each proportionate to the intensity of light received at an associated wavelength.

There will further be described a color-sensitive currency verifier which sequentially projects light of first and second wavelengths onto a test area of a specimen bill placed in said currency verifier for verification, detects the light received from the test area and generates first and second test signals respectively proportionate to the intensity of light of the first and second wavelengths received from the test area, and generates first and second normalized signals respectively proportionate to the first and second test signals by the same factor. The currency verifier determines the authenticity of the specimen bill based upon the difference between the first and second normalized signals.

It is a general object of the present invention to provide an improved color-sensitive currency verifier.

Another object of the present invention is to provide automatic compensation for changes in operating characteristics of light sources caused by aging and environmental conditions.

Another object of the present invention is to determine authenticity of a specimen bill based upon the difference between readings from the same test area independent of the condition of the test bill.

These and other objects and advantages of the present invention will become more apparent in the following figures and detailed description.

DESCRIPTION OF THE PREFERRED EMBODIMENT

Figure 1:
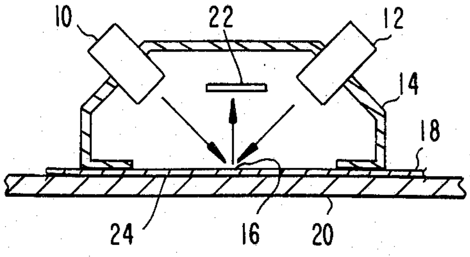
FIG. 1 is an elevation view of a color detection head according to the present invention.

For the purposes of promoting an understanding of the principles of the invention, reference will now to be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In the preferred embodiment of the present invention, two light-emitting diodes (LEDs) of different wavelengths are paired with a single broadband photodetector and a color detection head. Referring to FIG. 1, the preferred embodiment of the color detection head is illustrated, with LEDs 10 and 12 mounted in housing 14 at such an angle as to project light beams onto a common target area 16 on a specimen bill 18 which is transported past the detection head along metal slide 20 by a drive mechanism which will be described hereinafter. Light is reflected from target area 16 to photodetector 22 which generates output signals proportionate to the intensity of light received. Metal slide 20 has a portion under housing 14 with a white upper surface 24 to reflect all colors equally. Thus, any light rays which penetrate the paper or currency may be reflected back again to photodetector 22. As will be described, LEDs 10 and 12 are alternately energized for short periods of time over each target area. This results in a pair of light pulses which are reflected from the test area on the specimen bill. Photodetector 22 generates an output signal for each light pulse, the output signal being proportionate to the intensity of light of the respective wavelengths reflected from the bill surface. LED 10 is pulsed during a different time interval than LED 12 so that the single photodetector 22 receives pulses of reflected light corresponding with only one color.

LEDs 10 and 12 are preferably red and green diodes. The red diodes are gallium arsenide phosphide and the green diodes are gallium phosphide. These diodes are commercially available from Hewlett Packard as type 3750 and 3950, respectively. These are ultrabright LEDs with typical light brightness of 125 millicandela at a current of 20 milliamperes (ma) DC. LEDs 10 and 12 are pulsed rather than being constantly energized, tnus higher currents than 20 ma are possible due to the low ON duty cycle. The wavelength of the peak emission is approximately 630 nanometers (nm) for the red LED and 560 nm for the green LED. Alternatively, yellow or even infrared LEDs may be used, as long as a wide spectral difference is maintained such as between the red and green diodes described above.

Photodetector 22 is a photodetector of the planar diffusion type, manufactured by Hamamatsu as the type S1087-01, with a broadband total cell response covering 750 to 400 nm. These photocells have good high speed response, with typical rise times of 2.5 microseconds. The base material for the cell is silicon, which provides low drift with temperature.

Figure 2:
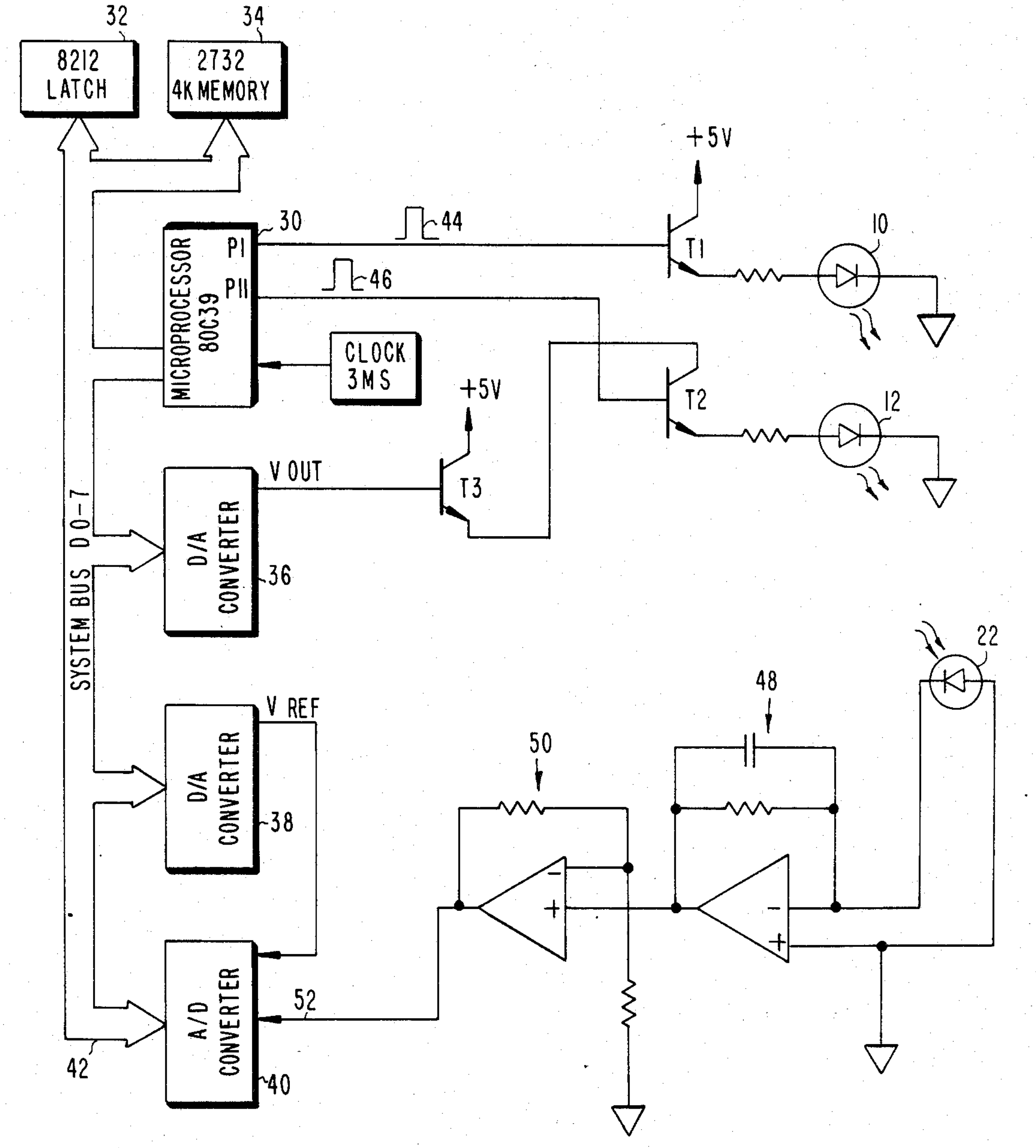
FIG. 2 is a schematic illustration of the electrical circuitry of a color-sensitive currency verifier according to the present invention.

Referring now to FIG. 2, the electrical circuit for the preferred embodiment of the currency verifier is depicted in partly schematic and partly block diagram form. The currency verifier employs a microprocessor 30, Intel Corp. type 80C39, to drive LEDs 10 and 12 and to process incoming data from photodetector 22.

Microprocessor 30 is coupled to and communicates with latch 32, memory 34, D/A converters 36 and 38, and A/D converter 40 by means of system bus 42, an 8-bit data bus. All elements of the circuit operate under the control of microprocessor 30, which compares incoming data from a specimen bill with data stored in memory 34 corresponding to a genuine bill. Latch 32 operates as a memory address register, holding the address of the next memory location to be accessed by microprocessor 30. Latch 32 and memory 34 are Intel part numbers 8212 and 2732, respectively.

In a typical program sequence, microprocessor 30 sequentially causes ports P1 and P11 to go high and low forming digital pulses 44 and 46, respectively, which are applied to transistors T1 and T2. Transistors T1 and T2 act as switches which pass current during the duration of an applied pulse. LEDs 10 and 12 consequently emit short bursts of light at different timed intervals determined by microprocessor 30. Light reflected from the bill surface is sensed by photodetector 22 and amplified by differential amplifier 48 and noninverting amplifier 50. The output pulses from amplifier 50 are furnished on line 52 to the signal input A/D converter 40. A/D converter 40 converts the incoming signals on line 52 to digital signals and supplies the digital data to microprocessor 30 on system bus 42 for processing, as will be described.

The output intensities of LEDs 10 and 12, although desirably equal in magnitude, tend to vary somewhat from each other due to different physical characteristics of the LEDs and different responses to varying environmental conditions including temperature, dust on the lens, etc. The present invention provides color balancing circuitry to balance the relative output intensities of the various LEDs. In the preferred embodiment illustrated in FIG. 2, LED 10 has a fixed output intensity and LED 12 has variable intensity. The output intensity of LED 12 is controlled by transistor T3 connected in series with transistor T2. D/A converter 36 supplies the base voltage V OUT to transistor T3 and thereby sets the emitter voltage of transistor T3 and the collector voltage of transistor T2. Thus, the current through LED 12 is adjusted by adjusting the level of V OUT. V OUT is in turn controlled in magnitude by the digital number supplied to D/A converter 36 by microprocessor 30. For example, the hexadecimal number 7F supplied to D/A converter 36 on the system bus might produce 2.5 volts DC output voltage to transistor T3. Increasing the number of hexadecimal FF might result in 5 volts DC on the V OUT line.

Figure 5:
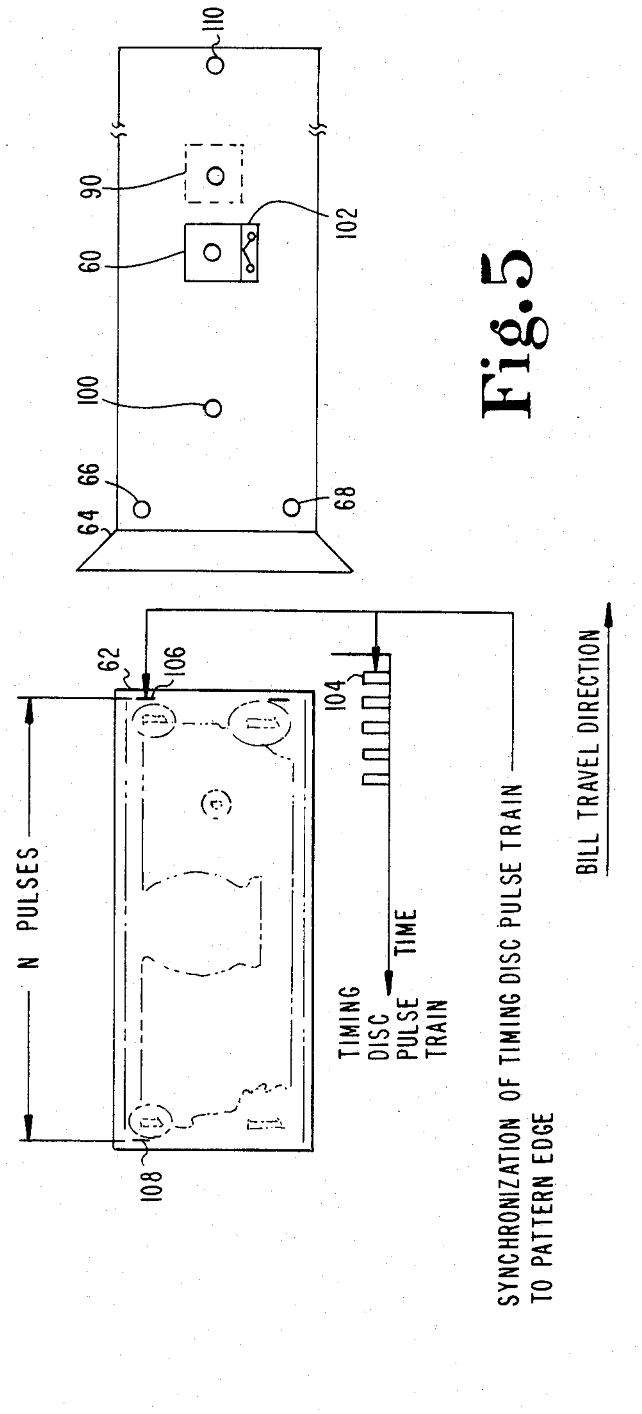
FIG. 5 illustrates the layout of photodetectors within a currency verifier according to the present invention with the specimen bill shown in a position for insertion into the currency verifier.

In the preferred embodiment the color balancing circuitry just described is activated during a color balancing interval just prior to the examination of a specimen bill. Referring brightly to FIG. 5, a color detection head such as that shown in FIG. 1 is shown at 60 in the travel path of a specimen bill 62 which is inserted into the currency verifier at entrance portion 64. Lead optical sensors 66 and 68 are provided to detect the leading edge of a specimen bill inserted into entrance portion 64. Upon such detection, specimen bill 62 is engaged by a drive mechanism which draws the specimen bill into the currency verifier at a predetermined rate. Simultaneously, microprocessor 30 initiates a color balancing interval which is completed before the leading edge of specimen bill 62 passes color detection head 60. White surface 24, shown in FIG. 1, is uncovered during the color balancing interval to provide a control surface for balancing of the two LEDs based upon the principle that red and green light will be reflected equally from a white background.

During the color balancing interval, microprocessor 30 supplies a series of incrementally increasing digital numbers to D/A converter 36 causing the drive current to LED 12 to incrementally increase. LEDs 10 and 12 are alternately energized, and photodetector 22 produces signals with amplitudes corresponding to the respective intensities of the LEDs. After amplification by amplifiers 48 and 50, these signals are converted to digital signals in A/D converter 40 and compared by microprocessor 30. When the magnitude of the reflected red light from white surface 24 equals the magnitude of the green light reflected from the same surface, the incrementing is stopped and the digital number producing the equality is latched into D/A converter 36. Thus, the color outputs of the two LEDs are balanced upon detecting the bill insertion.

Figures 3A, 3B:
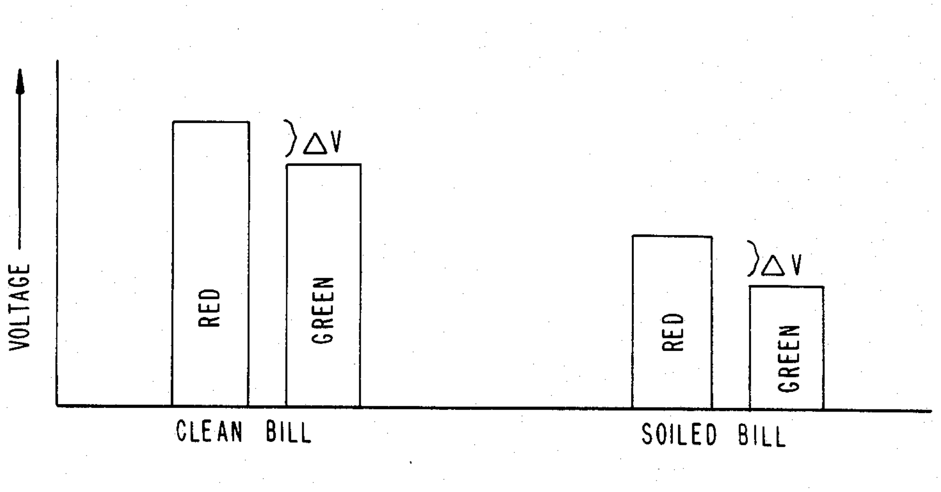
FIGS. 3A and 3B are graphical illustrations of the output signals produced by a photodetector of the type used in the currency verifier of FIG. 2 and particularly illustrate the effect of bill condition on signal levels.

It will be appreciated that a soiled bill will reflect less light than a clean bill and that, consequently, amplified photodetector output signals on line 52 will be reduced in amplitude proportionate to the degree of soiling. Typical amplified output signals produced for identical test areas of a clean bill and a soiled bill are shown in FIGS. 3A and 3B, respectively. If the color pulses shown in FIG. 3B were converted to digital values of the same resolution as the pulses shown in FIG. 3A, an error could result because the voltage difference between the red and green signals in FIG. 3B is less than the comparable value for the clean bill. Such errors could cause a genuine bill to be rejected or, worse, an invalid bill to be determined authentic. The preferred embodiment of the present invention obviates these difficulties by adjusting the conversion scale factor of A/D converter 40 for each test area.

Figure 7:
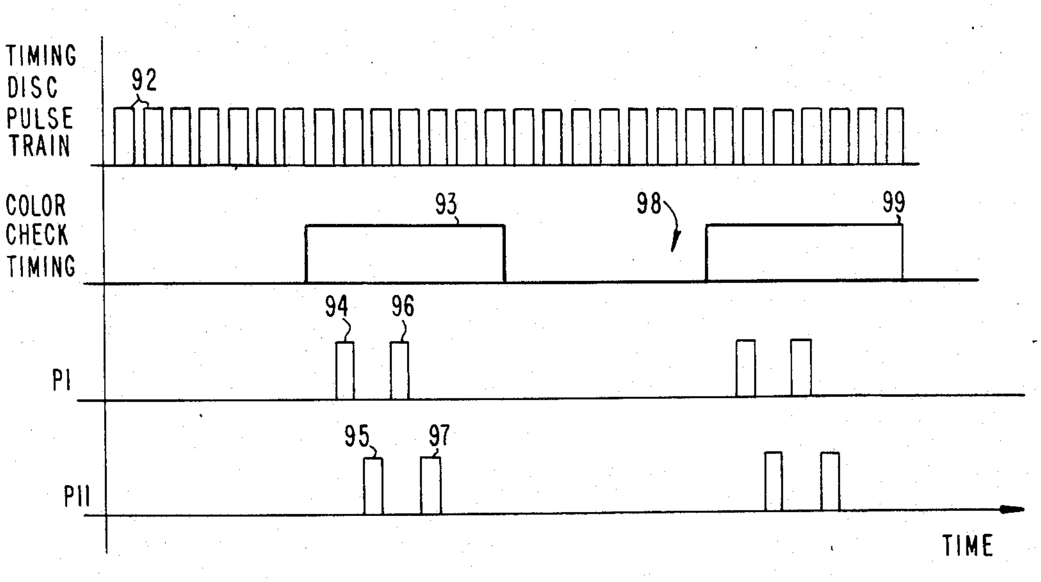
FIG. 7 is a timing diagram illustrating the relationship between timing pulses generated by the timing disc shown in FIG. 6 and color check timing pulses utilized by the currency verifier circuitry shown in FIG. 2.

With reference to FIG. 7, microprocessor 30 generates two pairs of pulses, the first pair comprised of pulses 94 and 95 and the second pair comprised of pulses 96 and 97. The first pair of pulses is associated with a reference area and the second pair is associated with a test area; in the preferred embodiment the reference area is coincident with the test area, and reference data is taken from each test area of the bill. The specimen bill is scanned so as to obtain data from many test areas. The first pair of pulses causes LEDs 10 and 12 to emit one burst of light each, and photodetector 22 generates a pair of reference signals in response. These reference signals are amplified and then converted by A/D converter 40 to digital reference numbers using a primary reference signal of 5 volts DC as the reference voltage (V REF) for A/D converter. Microprocessor 30 determines which reference number is greater in amplitude. A/D converter 40 is an 8-bit converter and thus has a maximum possible output value of hexadecimal FF. If, with the 5-volt reference voltage, the greater reference number from A/D converter 40 is less than hexadecimal FF, microprocessor 30 decrements the digital number supplied to D/A converter 38 until V REF equals the greater reference signal magnitude. Microprocessor 30 then adds a predetermined offset number to the number supplied to D/A converter 38 and applies the sum to converter 38. This is to maintain a desired margin, as will be described later. The sum number is then latched into D/A converter 38 for conversion of the test signals generated by photodetector 22 in response to the second pair of pulses. The first pair of pulses is also associated with a pattern check which will be described hereinafter.

After the reference voltage of A/D converter 40 is set as just described, the second pair of pulses is generated, and the corresponding light bursts cause photodetector 22 to generate a pair of test signals. Except for the effect of minor shifts in bill position in the currency verifier in the time between the two pairs of pulses generated by microprocessor 30, the reference and test signals have identical amplitudes. However, the digital numbers corresponding to the test signals are normalized by the greater of the two reference signals. Thus, assuming that no shift in bill position has occurred, the greater test digital number is equal to 255, hexadecimal FF, less the offset number previously mentioned. The offset provides a margin below the full-scale value of the A/D converter to avoid an overrange condition in the event a shift in bill position results in an amplitude increase in the photodetector output signals.

Figures 4A, 4B:
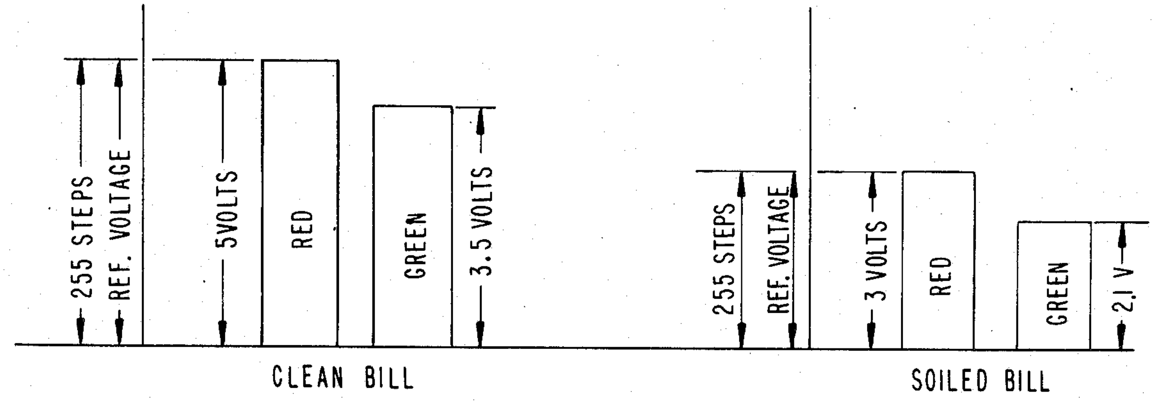
FIGS. 4A and 4B are graphical illustrations of amplified photodetector output levels particularly illustrating the effect of changing the A/D converter reference voltage on the resolution of the conversion process.

As an example of the above operation, attention is directed to FIGS. 4A and 4B which depict photodetector output signals for a test area as would be produced, respectively, by a clean bill and a soiled bill. In FIG. 4A, the larger reflected light signal is the red signal, which is equal to 5 volts. Microprocessor 30 responds to this signal pair by holding the V REF at 5 volts, thus digitizing according to a conversion scale of 255 steps for 5 volts. Any subsequent signal of 5 volts will be converted to a binary number equivalent to the number 255, hexadecimal FF. It will be noted that in this case no offset number can be added because the maximum available reference voltage is 5 volts.

In FIG. 4B both the red and green pulses are reduced in amplitude because the bill is soiled. The larger signal is at 3 volts instead of 5 volts. Accordingly, microprocessor 30 acts to lower the reference voltage to A/D converter 40 to slightly higher than 3 volts DC, allowing the margin described above, and thus digitizes the next signal pair according to a conversion scale of approximately 255 steps for 3 volts. Thus, a 3 volt signal will be converted to approximately hexadecimal FF and lower amplitude signals will be converted to correspondingly lower digital values.

Figure 6:
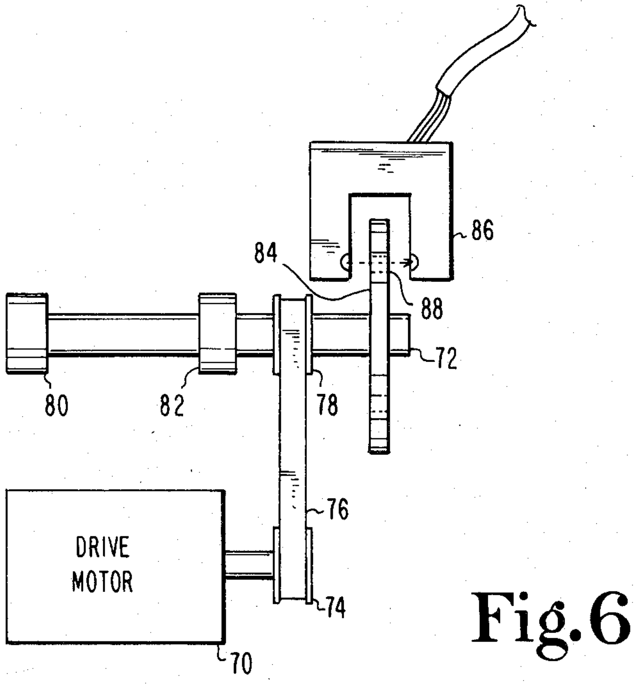
FIG. 6 is an illustration of the drive mechanism for transporting a specimen bill into the currency verifier and the timing disc coupled to the drive mechanism for generating timing pulses.

Referring now to FIG. 6, a drawing of the drive mechanism and timing disc as used in the currency verifier is provided. Drive motor 70 drives shaft 72 by means of pulley 74, drive belt 76 and pulley 78. Drive rollers 80 and 82 are fixed to shaft 72 and are arranged to engage a specimen bill partially inserted into the currency verifier for drawing the bill into the currency verifier. Also affixed to shaft 72 is a sensor disc 84 which is placed in the aperture of an infrared hole sensor 86. Hole sensor 86 contains an emitter and a photocell and sends and receives a radiation beam through holes 88 in disc 84. As disc 84 revolves the sensor develops electrical pulses which are output to microprocessor 30 (FIG. 2). Because of the common coupling of disc 84 and drive rollers 80 and 82, the timing disc revolves in synchronism with the specimen bill as the bill is transported past the various photocell sensors. Timing pulses developed by sensor disc 84 are as depicted in FIG. 7, with the relative time between pulses 92 being determined by the number and position of the various holes 88 in disc 84 and the speed of drive motor 70. Referring again briefly to FIG. 5, an additional color detection head 90 is shown adjacent to color detection head 60. Color detection head 90, shown in phantom view, is used to measure the color of the underside of the specimen bill while color detection head 60 measures the color on the upper side of the bill. It will be understood that color detection head 90 has associated with it a pair of LEDs and a photodetector identical to LEDs 10 and 12 and photodetector 22, and separate microprocessor output ports for those LEDs, as well as circuits corresponding to amplifiers 48 and 50, D/A converter 36 and the transistors driving the LEDs. Top and bottom checks are conducted alternately, as illustrated in FIG. 7 with intervals 93 and 99 representing top checks and interval 98 representing a bottom check. Microprocessor 30 counts seven timing disc pulses 92 and then generates a top color check timing interval such as interval 93. After the next seven pulses 92, microprocessor 30 generates a bottom color check timing interval such as interval 98. The bottom check is identical to the top check and will therefore not be separately described. During interval 93, microprocessor 30 outputs pulses 94–97 from ports P1 and P11 in the sequence shown in FIG. 7.

Since the microprocessor can process data at a high rate of speed, the steps taken to obtain a color check can be obtained by moving the bill at speeds of about 6 inches per second. At this speed, the specimen bill only travels about 0.030 inches in the time taken by the microprocessor to complete taking a color sample (5 milliseconds). Thus, many color checks are made as the bill is moved past the color detection heads. As stated previously, photocells 66 and 68 adjacent to the bill entrance portion 64 sense the edge of the bill as the bill is inserted by the customer. When either cell is covered, verifier drive motor 70 turns on and begins to rotate. The drive mechanism shown in FIG. 6 then draws the bill into the verifier track at approximately 6 inches per second. The exact speed of travel of the specimen bill is determined by measuring the time taken by the bill to travel the known distance from lead sensors 66 and 68 to tracking sensor 100, the next sensor in the travel direction of the bill.

Sensor 102 is used to detect the edge of the bill as it travels through the verifier and to synchronize the timing disc pulse train to the pattern edge. Sensor 102 is of the reflective type, and the emitter has a finely focused beam so that only a small spot on the bill is illuminated. Before any samples are stored in memory, reflective sensor 102 must see the bill edge. When the bill edge is detected, the processor is signaled and from then on in the program, the timing disc pulses are used to initiate tests of the specimen bill. The timing pulses define the test areas upon which light is projected for purposes of testing the bill. The synchronization of the timing disc pulse train to the pattern edge on the specimen bill is illustrated in FIG. 5 wherein the first timing disc pulse 104 is associated with a target area 106 and N succeeding timing disc pulses are respectively associated with target areas in the line extending from target area 106 to target area 108 at the trailing edge of the bill.

In addition to making a check for color, the graphical outline or printing on the face of the bill is checked in the preferred embodiment. That is, a pattern check and a color check are made sequentially one immediately after the other during timing intervals such as intervals 93, 98 and 99 already described. The pattern data for the top check is a function of pulses 94 and 95. As already described, all four pulses 94–97 affect the color check. The top pattern check provides the basis for an independent additional verification of the authenticity of the currency based on data stored in memory 34 corresponding to a genuine bill. Data obtained from the bottom pattern check is used to determine the denomination of the bill. The velocity of the bill and the number of timing pulses are such that the printed design on the bill and the pattern and color samples are synchronized to within ±0.0135 inches.

As has been indicated, sensors 66 and 68 detect the leading edge of the bill, and the drive motor is started when either one of these sensors is covered. Later, after the bill has traveled approximately ½ inch as determined by the approximate travel speed, both sensors 66 and 68 are checked again. The bill is rejected if sensors 66 and 68 are not both covered at this time. This prevents the currency verifier from falsely recognizing calling cards or torn slips of paper which may be inserted.

The length of the bill is measured in addition to the tests already described. Sensor 110 is provided for this purpose and is located at a distance from the line between sensors 66 and 68 equal to one-eighth of an inch less than the average length of the currency expected to be inserted into the machine. These three sensors are thus positioned such that a normal bill will cover all three of them at some point in the transport of the specimen bill into the machine. When sensor 110 first detects the leading edge of the specimen bill, microprocessor 30 checks sensors 66 and 68 to determine if the trailing edge of the bill is covered at that time. If either sensor 66 or sensor 68 is uncovered at the time sensor 110 is first covered, the specimen bill is rejected as too short. When the bill has traveled an additional ¼ inch after sensor 110 is first covered, microprocessor 30 again checks sensors 66 and 68. If either is covered, the bill is rejected as too long. A ¼ inch tolerance is allowed in the length of the specimen bill to allow for variations of up to ¼ inch which are found to exist among genuine bills of U.S. denomination.

A further check of the trailing edge of a specimen bill is made by checking sensor 100. If sensor 100 is detected to be uncovered later than it should be, the specimen bill is again rejected. This test detects bills that have tape or an extension of some type attached to them.

In yet another embodiment, only three pulses are generated, the first being for the pattern check and for establishing the reference voltage of A/D converter 40, and the second and third being for the test signals in the color check. In this embodiment, microprocessor 30 generates a pulse either out of port 1 or port 11 based on a priori knowledge of the greater signal for each test area. Microprocessor 30 the supplies D/A converter 38 with a digital reference number corresponding to the magnitude of the resulting amplified output signal of photodetector 22, and conversion of the succeeding two signals, which are the test signals for the color check, is accomplished in the manner described above with reference to FIG. 7.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. A color-sensitive currency verifier, comprising:

(a) a plurality of narrowband light sources arranged to project light onto a test area of a specimen bill placed in said currency verifier for verification, each of said light sources emitting light of a unique wavelength when energized;

(b) means for sequentially energizing said light sources, said energizing means including means for energizing one of said light sources to project light of one of said wavelengths onto a predetermined reference area of the bill indicative of bill condition;

(c) a single broadband photodetector optically coupled to said plurality of light sources and operative to produce output signals proportionate to the intensity of light received respectively from said light sources;

(d) color balance means coupled to said light sources and said photodetector for balancing the relative output intensities of said light sources in response to output signals produced by said photodetector;

(e) means for activating said color balance means for a color balancing interval prior to examination of said specimen bill; and (f) circuit means coupled to said photodetector for determining the authenticity of the specimen bill, said circuit means including (1) means for generating a first reference signal proportionate to the intensity of light received from said reference area;

(2) means operative during a test interval for normalizing output signals produced by said photodetector with respect to a scale factor based upon said first reference signal, whereby test signals produced by said photodetector are normalized with respect to the condition of said specimen bill; and (3) means for determining the authenticity of the specimen bill based upon said normalized signals, wherein one light source is a reference light source of fixed intensity and the remaining light sources have variable intensity; said photodetector generates a balancing reference output signal in response to light received from said reference light source during said color balancing interval; and in which said color balance means includes means for automatically adjusting the intensities of said remaining light sources during said color balancing interval until their corresponding photodetector output signals match said balancing reference output signal.

2. The currency verifier of claim 1 in which said activating means activates said color balance means when a specimen bill is inserted into said currency verifier.

3. The currency verifier of claim 2 in which said color balance means incrementally increases the intensity of each of said remaining light sources from zero intensity to an intensity corresponding to said balancing reference output signal.

4. The currency verifier of claim 3 further comprising:

(g) means for receiving the specimen bill inserted into said currency verifier, said receiving means including an entrance portion and a slide member positioned in line with said entrance portion, said slide member having a portion with a white reflective surface;

(h) a color detection head mounted in opposition with said reflective surface, said color detection head housing said light sources and said photodetector; and (i) drive means for transporting the specimen bill from said entrance portion along said slide member and between said reflective surface and said color detection head;

and in which said activating means includes optical sensing means adjacent said entrance portion for sensing the leading edge of the bill inserted into said currency verifier.

5. The currency verifier of claim 4 in which said currency verifier is operative with respect to a plurality of test areas on the specimen bill.

6. The currency verifier of claim 5 in which each of said light sources is an LED and in which said energizing means, color balance means, activating means and circuit means are controlled by a microprocessor.

7. The currency verifier of claim 6 in which said energizing means energizes each of said light sources twice for each test area; and in which said photodetector is responsive thereto to produce first and second signal pairs, said second signal pair including first and second test signals, said currency verifier further comprising:

(j) means for generating first and second normalized signals respectively proportionate to said first and second test signals by the same factor, said factor being proportionate to the greater of the signals in said first signal pair; and (k) means for determining the authenticity of the specimen bill based upon the difference between said first and second normalized signals.

8. The currency verifier of claim 7 in which said circuit means includes means for determining the denomination of the specimen bill based upon the photodetector output signals corresponding to said plurality of test areas.

9. A color-sensitive currency verifer, comprising:

(a) means for illuminating a specimen bill placed in said currency verifier for verification, said illuminating means including (1) first means for sequentially projecting light of first and second wavelengths onto a reference area; and (2) second means for sequentially projecting light of said first and second wavelengths onto a test area;

(b) detection means for detecting light received from said reference and test areas, said detection means including means for generating analog signals proportionate to the intensity of light of the respective wavelengths received from said reference and test areas, said analog signals including a pair of inference signals corresponding to said reference area and a pair of test signals corresponding to said test area;

(c) circuit means operative during a test-signal conversion interval for producing a third reference signal proportionate to the greater of said analog reference signals;

(d) a variable-reference A/D converter having a signal input coupled to said detection means and a reference input coupled to said circuit means, whereby said A/D converter converts said analog test signals to digital test numbers based upon said third reference signal during said test-signal conversion interval; and (e) digital means for determining the authenticity of the specimen bill based upon said digital test numbers.

10. The color-sensitive currency verifier of claim 9 in which said reference and test areas are coincident.

11. The color-sensitive currency verifier of claim 10 in which said A/D conversion means converts said analog reference signals to digital reference numbers based upon a primary reference signal of predetermined value; and in which said circuit means includes:

(1) means for producing said primary reference signal;

(2) means coupled to said A/D conversion means for determining the greater of said digital reference numbers;

(3) means for producing the sum of a predetermined number and said greater digital reference number; and (4) D/A conversion means for converting said sum to a third reference signal.

12. The currency verifier of claim 11 in which said first and second projecting means include a common pair of narrowband light sources arranged to project light onto said test area, one of said light sources being operable to emit light of said first wavelength and the other of said light sources being operable to emit light of said second wavelength; said illuminating means includes means for operating said first projecting means before operating said second projecting means; and in which said detection means includes a single broadband photodetector optically coupled to said light sources.

13. The currency verifier of claim 12 in which each of said light sources is an LED and in which said illuminating means, circuit means and digital means are controlled by a microprocessor.

14. A color-sensitive currency verifier, comprising:

(a) projecting means for sequentially projecting light of first and second wavelengths onto a test area of a specimen bill placed in said currency verifier for verification, said projecting means including means for projecting light of one of said wavelengths onto a reference area of the bill before said sequential projection of light is performed;

(b) detection means coupled to said projecting means for detecting light received from said test area, said detection means including means for generating first and second test signals respectively proportionate to the intensity of light of said first and second wavelengths received from said test area, said detection means further including means for detecting light received from said reference area and for generating a first reference signal proportionate to the intensity of light received from said reference area;

(c) means for determining a scale factor based upon said first reference signal;

(d) means for generating first and second normalized signals respectively proportionate to said first and second test signals by said scale factor, whereby said first and second normalized signals are normalized with respect to the condition of said specimen bill; and (e) means for determining the authenticity of the specimen bill based upon the difference between said first and second normalized signals.

15. The currency verifier of claim 14 in which said projecting means projects light of said second wavelength onto said reference area before said sequential projection of light is performed; in which said detection means generates a second reference signal proportionate to the intensity of light of said second wavelength received from said reference area; and in which said scale factor determining means determines said scale factor based upon the greater of said first and second reference signals.

16. The currency verifier of claim 15 in which said reference and test areas are coincident.

17. The currency verifier of claim 16 in which said currency verifier is operative with respect to a plurality of test areas on the specimen bill.

18. The currency verifier of claim 17 in which said projecting means includes first and second narrowband LEDs, said first and second LEDs being operable to emit light of said first and second wavelengths, respectively, said currency verifier further comprising:

(f) color balance means coupled to said LEDs and said detection means for balancing the relative output intensities of said LEDs during a color balancing interval.

19. A color-sensitive currency verifier, comprising:

(a) projecting means for sequentially projecting light of first and second wavelengths onto a test area of a specimen bill placed in said currency verifier for verification, said projecting means including means for projecting light of one of said wavelengths onto a predetermined reference area of the bill indicative of bill condition;

(b) detection means coupled to said projecting means for detecting light received from said test area and said reference area, said detection means including (1) means for generating a reference signal proportionate to the intensity of light received from said reference area; and (2) means for generating first and second test signals respectively proportionate to the intensity of light of said first and second wavelengths received from said test area;

(c) variable-gain means for generating first and second normalized signals respectively proportionate to said first and second test signals, said variable-gain means including a gain control input;

(d) processing means for deriving a gain control signal from said reference signal, said processing means having an output coupled to said gain control input, whereby the gain of said variable-gain means is varied in response to the condition of the bill; and (e) means for determining the authenticity of the specimen bill based upon the difference between said first and second normalized signals.

20. The currency verifier of claim 19 in which said projecting means sequentially projects light of said first and second wavelengths onto said reference area; in which said detection means generates first and second reference signals respectively proportionate to the intensity of light of said first and second wavelengths received from said reference area; and in which said processing means includes means for deriving said gain control signal from the greater of said first and second reference signals.

* * * * *